US012269639B2

(12) United States Patent
Wiegel et al.

(10) Patent No.: US 12,269,639 B2
(45) Date of Patent: Apr. 8, 2025

(54) LABELLING DEVICE

(71) Applicant: Espera-Werke GmbH, Duisburg (DE)

(72) Inventors: Mario Wiegel, Essen (DE); Artem Vinokurov, Moers (DE); Thorsten Zerfaß, Mülheim an der Ruhr (DE)

(73) Assignee: Espera-Werke GmbH, Duisburg (DE)

( * ) Notice: Subject to any disclaimer, the term of this patent is extended or adjusted under 35 U.S.C. 154(b) by 114 days.

(21) Appl. No.: 18/036,325

(22) PCT Filed: Oct. 14, 2021

(86) PCT No.: PCT/EP2021/078464
§ 371 (c)(1),
(2) Date: May 10, 2023

(87) PCT Pub. No.: WO2022/100953
PCT Pub. Date: May 19, 2022

(65) Prior Publication Data

US 2024/0010379 A1 Jan. 11, 2024

(30) Foreign Application Priority Data

Nov. 16, 2020 (DE) .................... 10 2020 130 225.8

(51) Int. Cl.
*B65C 9/28* (2006.01)
*B65C 9/40* (2006.01)

(52) U.S. Cl.
CPC . *B65C 9/28* (2013.01); *B65C 9/40* (2013.01)

(58) Field of Classification Search
CPC ................ B65C 9/28; B65C 9/36; B65C 9/40
See application file for complete search history.

(56) References Cited

U.S. PATENT DOCUMENTS 3,645,832 A 2/1972 Sauer
8,168,033 B1 5/2012 Mohamad Nor
(Continued)

FOREIGN PATENT DOCUMENTS

DE 102014119391 A 12/2015
JP 2010023862 A 2/2010
WO WO-2022100953 A1 * 5/2022 ............... B65C 9/28

OTHER PUBLICATIONS

Written opinion for PCT/EP2021/078464 (Year: 2022).*
International Search Report dated Feb. 4, 2022 filed in PCT/PCT/EP2021/078464.

*Primary Examiner* — Sonya M Sengupta
(74) *Attorney, Agent, or Firm* — Rankin, Hill & Clark LLP

(57) ABSTRACT

The invention relates to a labelling device, in particular a price-displaying device, for labelling individual packages (2), comprising: a feed assembly (3) for transporting particular packages (2); a label-dispensing assembly (9) for dispensing a label (8) that can be detached from a material strip (10) in a dispensing direction as far as a transfer position; and a label-application assembly (13) for applying the label (8) dispensed in the transfer position onto the surface of the package (2); wherein the label application assembly (13) comprises a label-suction assembly (15) which picks up a label (8) dispensed by the label-dispensing assembly (9) and holds it in the transfer position, from which position the label (8) is transferred to the surface of the package (2). According to the invention, the label-suction assembly (15) is designed to generate a first airflow and to conduct the airflow such that both a suction force and a compressive force are exerted on the label (8) in the transfer position.

29 Claims, 4 Drawing Sheets

(56) References Cited

U.S. PATENT DOCUMENTS

Figure 1:
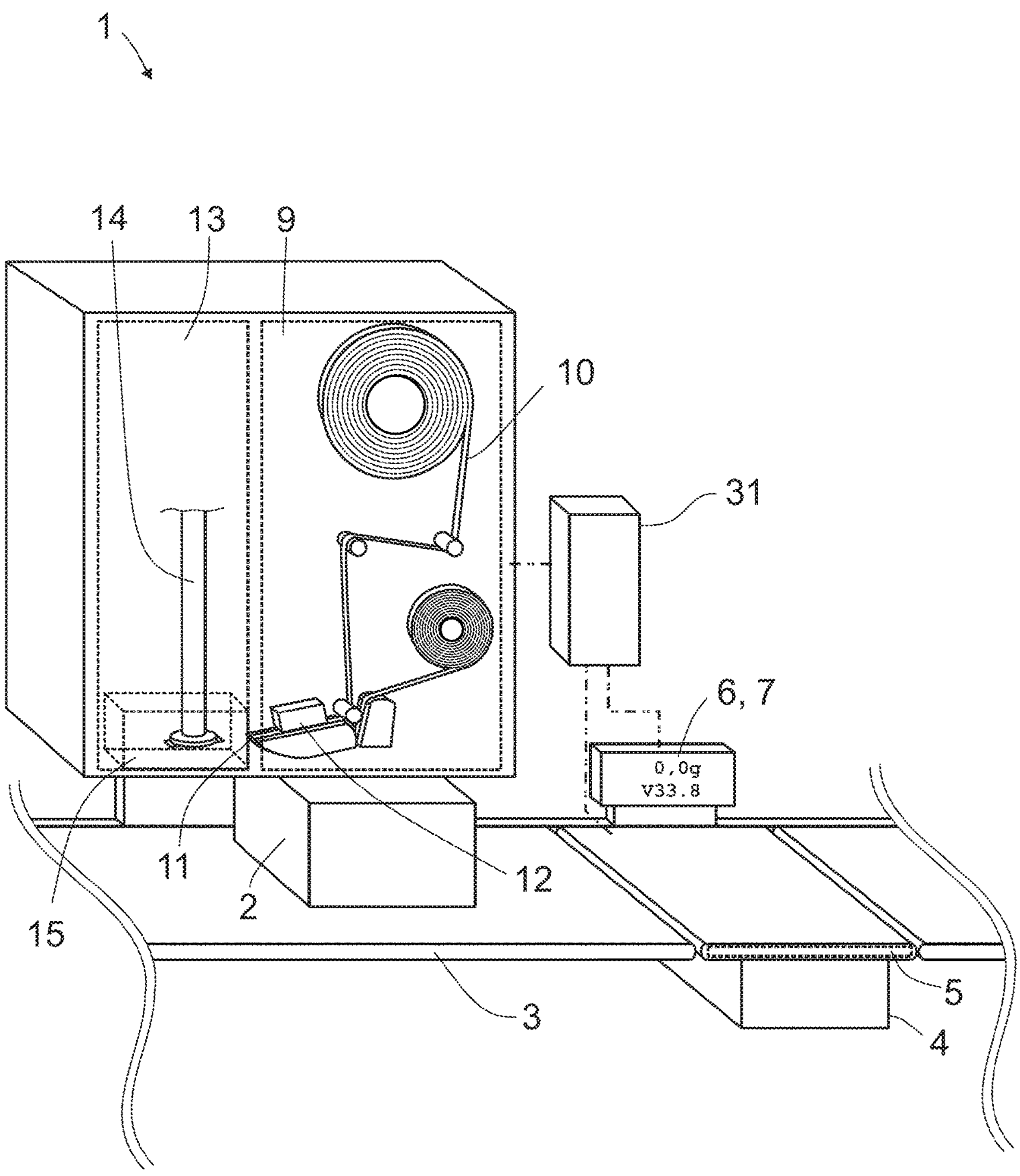

| | | | |
|---|---|---|---|
| 2017/0341799 A1 | 11/2017 | Korthäuer et al. | |
| 2024/0010379 A1* | 1/2024 | Wiegel | B65C 9/28 |

* cited by examiner

LABELLING DEVICE

The invention relates to a labelling device, in particular a price labelling device, for labelling individual packages according to the preamble of claim 1.

In labelling devices of the type in question here, individual packages are transported by means of a feed assembly and supplied to a label application assembly. The label application assembly serves to pick up labels, which are supplied by means of a label dispensing assembly and in particular have been printed individually by means of a printer, and transfer them to the surface of the package.

In a known labelling device (DE 10 2014 119 391 A1), from which the invention proceeds, the label application assembly has a label suction assembly which is in the form of a holding base having two skids and by means of which a label dispensed by the label dispensing assembly can be picked up and fixed in a transfer position by means of negative pressure. From the transfer position, the label is then transferred by a plunger, here a pendulum type plunger having a blow-off head, to the surface of the package in an application movement.

The label is fixed to the label suction assembly in that said assembly draws in air by way of suction openings in a support surface for the label and accordingly, when the label in question covers the suction openings, exerts a suction force on the label. A challenge here is to hold the label in question as securely as possible in the transfer position. Only in that way can the label be picked up precisely by the plunger and applied precisely to the package. It must thus be ensured that, in the transfer position, the label is positioned as optimally as possible relative to the plunger and does not slip on transfer to the plunger.

The invention is based on the problem of configuring and developing a labelling device for labelling individual packages in such a manner that a label dispensed by a label dispensing assembly can be fixed as optimally as possible to a label application assembly in a transfer position.

The above problem is solved in the case of a labelling device according to the preamble of claim 1 by the features of the characterizing part of claim 1.

A fundamentally important consideration is, on the one hand, not only to fix a label in the transfer position, from which it is transferred to the surface of the package, by suction, that is to say by means of a suction force, but additionally also to blow an air stream at the label and thereby additionally press the label. On the other hand, it is important that the same air stream is used both for suctioning and for pressing the label. The label is thus subjected on both sides to a force generated by the air stream, namely to a suction force on its label suction side and to a pressing force on its opposite label pressure side. In the case of adhesive labels which have on a so-called adhesive side an adhesive layer for sticking to the package, the label pressure side is in particular the adhesive side.

It should be emphasized that the same air stream is used to generate the suction force on the one hand and the pressing force on the other hand, rather than providing two separate sources, each of which generates its own air stream, namely one for suctioning and another for pressing. The proposed single air stream on the one hand generates a negative pressure in the label suction assembly, which effects suctioning of the label onto the label suction assembly and accordingly the suction force exerted on the label. On the other hand, the same air stream generates an excess pressure on the opposite side of the label, which effects pressing of the label onto the label suction assembly and accordingly the pressing force exerted on the label.

With the proposed labelling device, the label is thus fixed in the transfer position under the effect of a suction force and of a pressing force. The suction force is preferably sufficiently great that it is sufficient on its own to hold the label in the transfer position. The additional pressing force here improves fixing. The pressing force thus ensures in particular that the label is in contact with the label suction assembly as far as possible over its entire surface. The greater the area of contact of the label with the label suction assembly, the more securely the label is held and the more precisely it can be transferred to the package. The air stream that is blown onto the label in particular ensures that labels which are provided in the label dispensing assembly in wound form as rolls and accordingly leave said assembly with a more or less pronounced bend can be pressed flat and thus with their entire surface onto the label suction assembly or the corresponding support surface. This increases the suction effect and improves the secure hold.

A further advantage of the proposed labelling device is that it is particularly energy-efficient, since the same air stream that is provided for suctioning the label is also used for additionally blowing the label. There is thus used for the additional blowing in particular the outgoing air stream which is present in any case as a result of the suction. The energy efficiency can be increased still further by the use of one or more internal flow machines, in particular fans, to generate said air stream, so that an external, central compressed air supply (compressed air system), which is frequently inefficient, is not necessary.

Specifically, it is proposed that the label suction assembly is adapted to generate a first air stream and to guide said first air stream in such a manner that both a suction force and a pressing force are exerted on the label in the transfer position.

Claim 2 relates to a first negative pressure generating unit with which said suction force and said pressing force can be generated. An air guiding unit associated therewith serves to guide the air stream for exerting the pressing force and in particular also for exerting the suction force in a particular manner.

Claims 3 to 5 relate to a support surface for the label in the transfer position, and to suction openings through which the air stream that suctions the label is guided into the label suction assembly.

According to the particularly preferred embodiment as claimed in claim 6, the first negative pressure generating unit has a first flow machine, in particular a first fan, for generating the first air stream. The label suction assembly, and in particular the labelling device as a whole, can consequently be operated without an external, central compressed air supply or without being connected to a compressed air system, which is particularly energy-efficient.

Claims 7 and 8 relate to particularly preferred embodiments of the first air guiding unit, in order to exert the pressing force on the label in as simple a way as possible by means of the first air stream.

In claim 9 there is indicated a particularly preferred spatial arrangement of the support surface onto which the label is suctioned relative to the outlet opening through which the air stream is guided for exerting the pressing force on the label.

In addition to the first air stream mentioned above, the label suction assembly can further be adapted, according to a further preferred embodiment, to generate yet a further, second air stream which exerts an additional suction force on the label (claim 10). At the labels, two air streams can in this manner each exert a suction force on the label at a different point and thereby fix the label in the transfer position particularly securely. This is advantageous in particular in the case of relatively short labels, since these could otherwise be blown away, which will be explained in greater detail hereinbelow. A corresponding suction force can here be generated on the first half of a label by the first air stream and on the second half of a label by the second air stream, based on a direction transverse to the dispensing direction.

A negative pressure generating unit and an air guiding unit associated therewith can also be provided for generating the second air stream (claim 11). Corresponding suction openings through which the second air stream that is generated is guided into the label suction assembly can also be provided (claims 12 and 13).

According to the particularly preferred embodiment as claimed in claim 14, the second negative pressure generating unit also has a flow machine, in particular a fan, for generating the second air stream.

Claim 15 relates to preferred embodiments of the second air guiding unit by means of which the second air stream for generating the further suction force can be guided.

Additional possible uses of the first and/or second air stream are the subject matter of claims 16 and 17. In particular, according to those claims, an air stream can be used for dissipating heat and/or its temperature can be controlled.

Further preferred embodiments of the proposed labelling device are indicated in claims 18 to 23. Particularly preferably, the label application assembly has a plunger by means of which the label is transferred from the transfer position to the surface of the package (claim 10).

Figure 2:
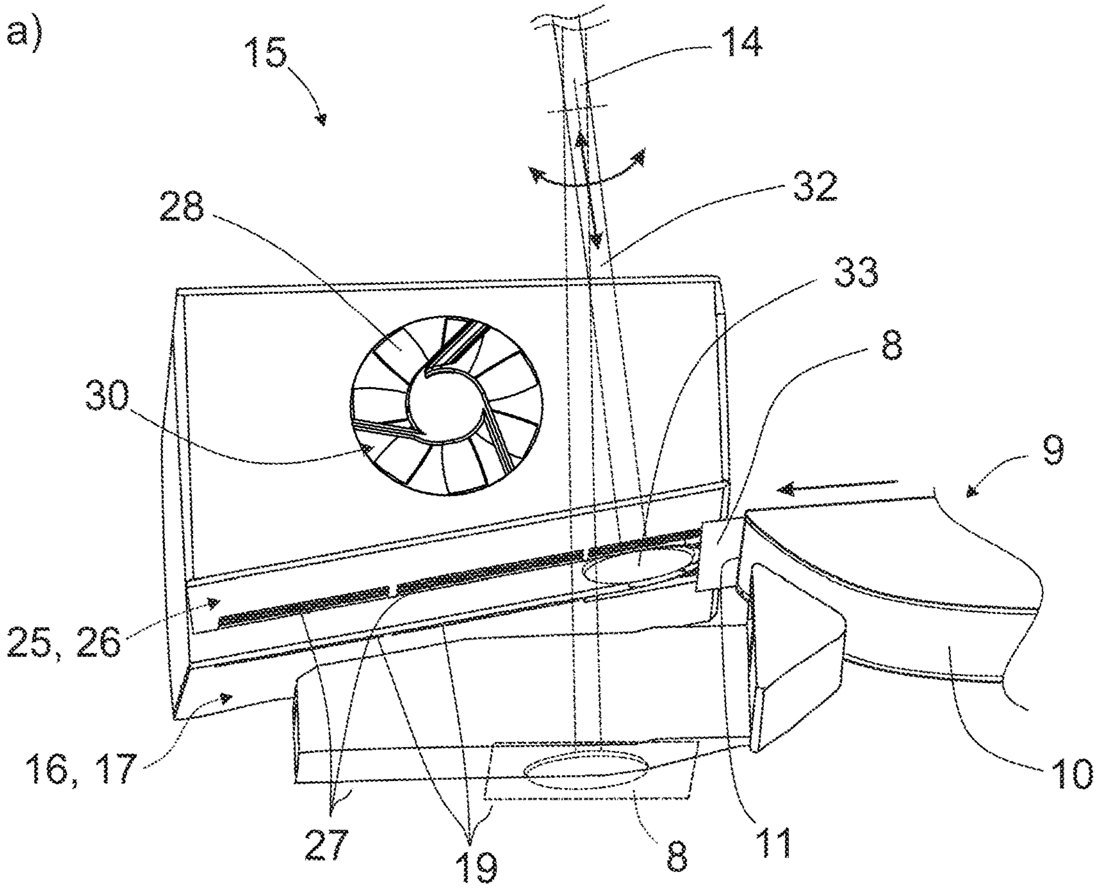
Figure 2:
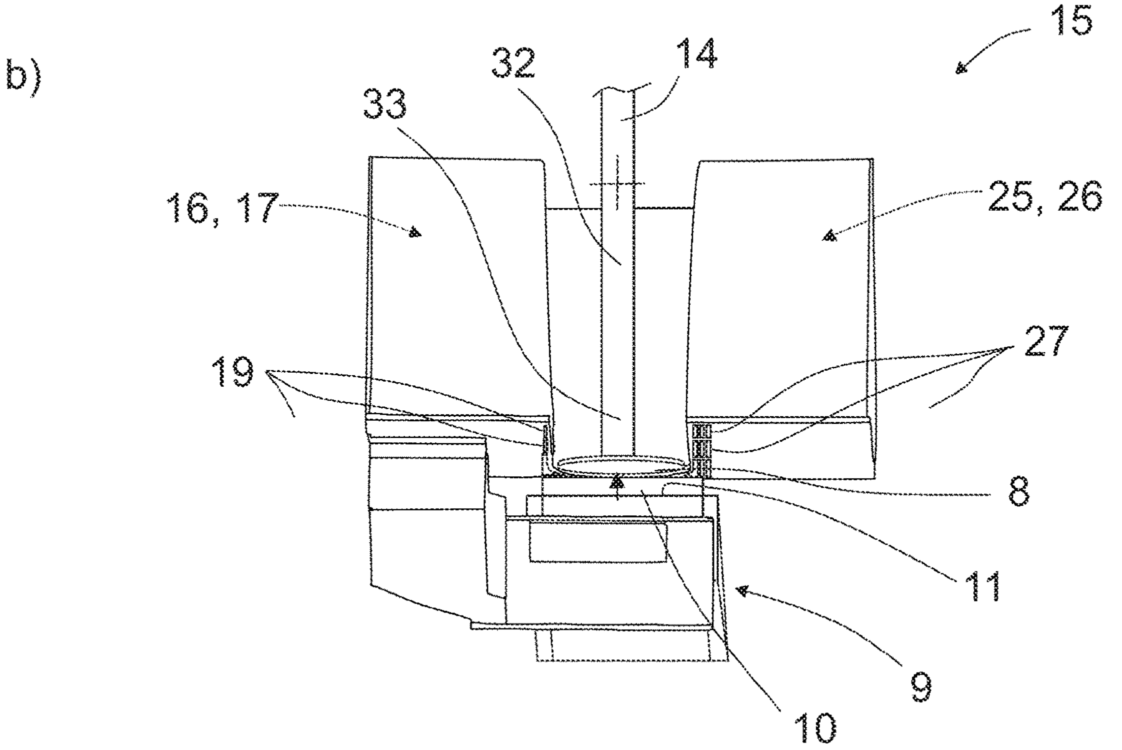
Figure 3:
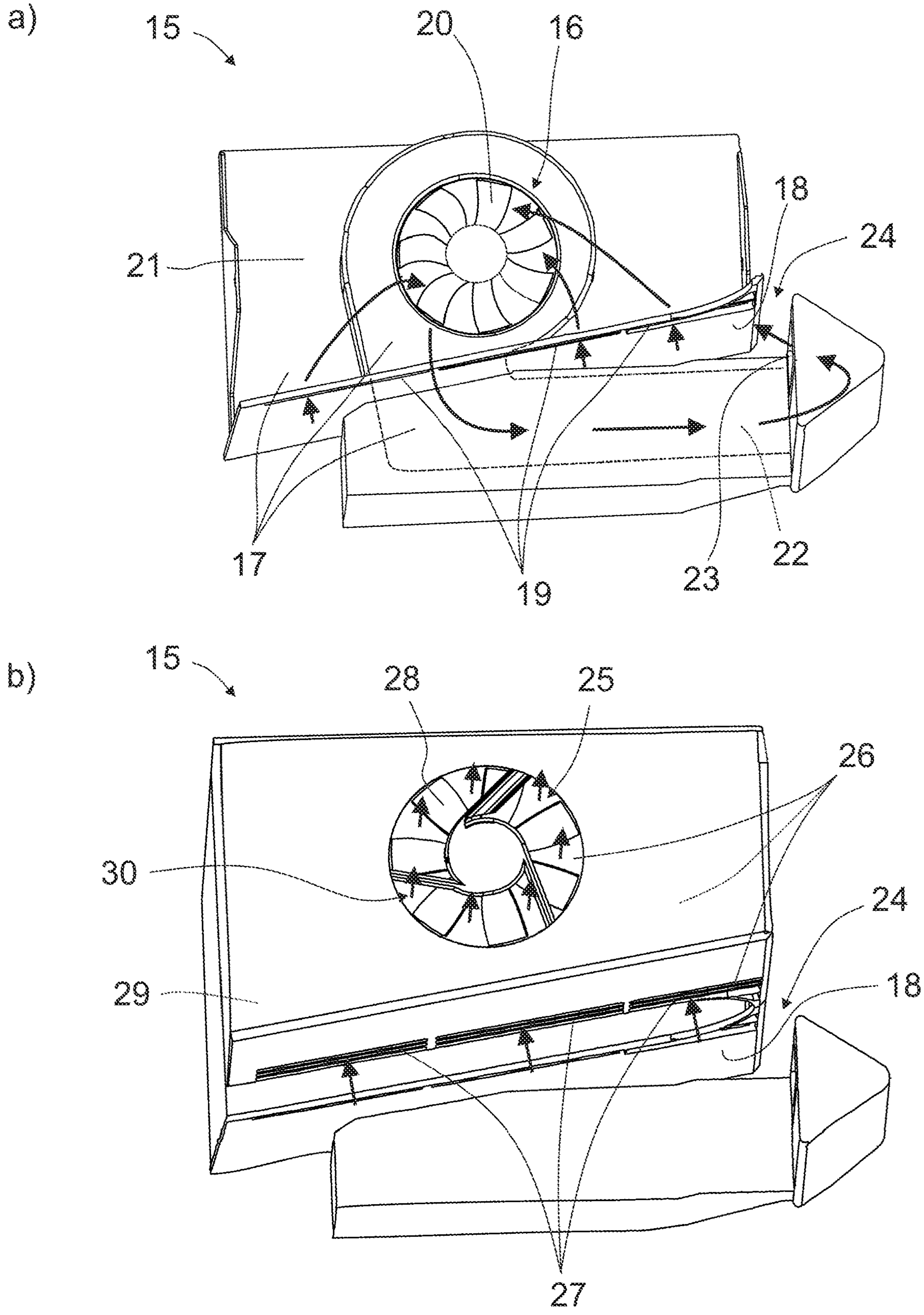
Figure 4:
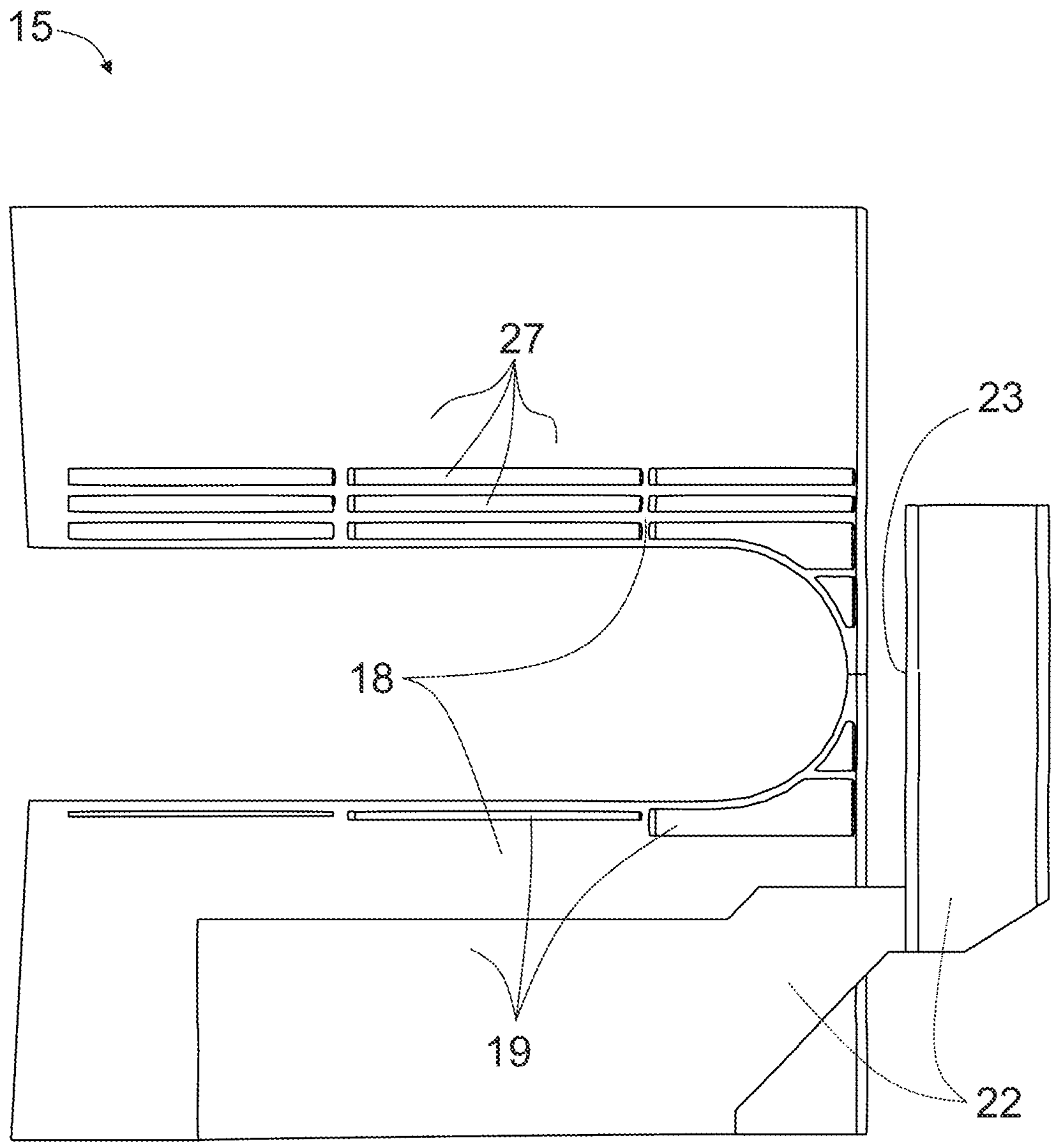

The invention will be explained in greater detail hereinbelow with reference to a drawing showing only one exemplary embodiment, in which:

FIG. 1 shows a schematic representation of the proposed labelling device,

FIG. 2 shows a schematic representation of a label application assembly and a label dispensing assembly, which cooperates therewith, of the labelling device according to FIG. 1 in a) a first perspective view and b) a second perspective view, FIG. 3 shows a schematic representation of a) a first air stream and b) a second air stream generated by a label suction assembly of the label application assembly according to FIG. 2, and FIG. 4 shows a schematic representation of the label suction assembly according to FIG. 3 in a bottom view.

FIG. 1 shows, in a schematic representation, a proposed labelling device 1 in a preferred embodiment as a price labelling device which serves for the labelling of individual packages 2.

The labelling device 1 is equipped with a feed assembly 3 for transporting packages 2. The feed assembly 3 is preferably a belt conveyor or a roller conveyor, optionally also at least one robotic arm, for moving the packages 2. The feed assembly 3, here the belt conveyor, here and preferably has at least one transport belt by means of which the packages 2 are transported in a transport direction.

Here and preferably, the labelling device 1 further has a weighing assembly 4, which has a sensor unit 5 which here is integrated in the feed assembly 3, in particular in one of the transport belts, for determining sensor data relating to the weight of the individual packages 2. Preferably, the sensor unit 5 is adapted to determine the sensor data while the packages 2 are moving through the labelling device 1 and thus in continuous operation of the labelling device 1. The weight determined for each package 2, and optionally a price that is dependent on the determined weight, is here and preferably displayed by way of a user interface 6, in particular a display device 7 of the user interface 6.

In addition or alternatively, the weight and/or the price is printed on a label 8 which is to be applied to the surface of the package 2.

The labelling device 1 thus has a label dispensing assembly 9 for dispensing a label 8, which can be removed from a strip of material 10, in a dispensing direction into a transfer position. A label 8 which can be removed from a strip of material 10 means in particular a label which is removably attached by means of its adhesive surface to a carrier strip, which forms the strip of material 10 and can consist, for example, of paper and/or plastics material. It is likewise possible that the label 8 is produced by separating a portion from a printable or printed strip of material 10, for example by cutting and/or tearing the strip of material 10. Here and according to a preferred embodiment there are used labels in the form of adhesive labels, which already have an adhesive surface on the strip of material 10. The strip of material 10 is here guided over a dispensing edge 11, whereby the labels 8 are removed. It is likewise also conceivable to use adhesive-free labels, which are not provided with an adhesive surface until later or are applied to an adhesive surface on the package 2. Here and preferably, the label dispensing assembly 9 has a printer 12, here a thermal printer, which is adapted to print the weight of the package 2 and/or a price corresponding to the weight and/or other information on the respective label. The printer 12 is here arranged before the dispensing edge 11, based on the dispensing direction of the labels 8, but according to another embodiment, not shown here, can in principle also be arranged after the dispensing edge 11.

The dispensing direction is here the direction of movement of the label 8 while it is being conveyed by the label dispensing assembly 9 and is finally dispensed into said transfer position.

The transfer position is the position of the label 8 from which it is then transferred, as follows, to the surface of the package 2. The labelling device 1 thus has, here in a common housing with the label dispensing assembly 9, a label application assembly 13 for applying the dispensed label 8 to the package 2. Application of the label 8 to the surface of the package 2 can be carried out mechanically and/or pneumatically in different ways, in particular by means of a plunger 14 which will be described further hereinbelow.

For precise transfer of the label 8 from the transfer position to the package 2, the label 8 must be fixed securely in the transfer position until it is transferred. For this purpose, the label application assembly 13 has a label suction assembly 15, which picks up a label 8 dispensed by the label dispensing assembly 9 and fixes it in the transfer position, from which the label is transferred to the surface of the package 2. In the case described here as a preferred exemplary embodiment, the label suction assembly 15 serves to transfer the labels 8 removed from the strip of material 10, in each case starting from the dispensing edge 11, to the plunger 14. To that end, the label 8, while it is being removed from the strip of material 10 at the dispensing edge 11, is here and preferably conveyed into the transfer position by the advancing movement of the strip of material 10 and is fixed there until the label 8 is transferred, here by the plunger 14, to the package 2 (FIGS. 2*a*) and *b*)).

It is important that the label suction assembly 15 is adapted to generate a first air stream (represented in FIG. 3*a*) by corresponding arrows) and to guide said first air stream in such a manner that both a suction force and a pressing force are exerted on the label 8 in the transfer position.

The label suction assembly 15 of the proposed labelling device 1 is thus configured such that the same air stream is used to suction the label (on its label suction side) and to blow the label (on its label pressure side). "The same air stream" means that air that is part of the incoming air stream ("incoming air" for short) also leaves again as part of the outgoing air stream ("outgoing air" for short). The incoming air and the outgoing air are thus fluidically connected to one another, that is to say, for example, the flow speed of the incoming air and the flow speed of the outgoing air are dependent on each other. The incoming air stream and/or the outgoing air stream can each be a single stream or can consist of a plurality of partial air streams. Here and preferably, as is shown in FIG. 3*a*), the incoming air, that is to say the air flowing into the label suction assembly 15, consists of a plurality of partial air streams, since it is introduced into the label suction assembly 15 at a plurality of points, whereas the outgoing air, that is to say the air flowing out of the label suction assembly 15, is a single air stream, since the outgoing air is guided through a common channel and leaves the label suction assembly 15 at the same point. In particular, the same negative pressure generating unit 16, as will be described further hereinbelow, serves to generate the same, here the first, air stream.

Here and preferably, the label suction assembly 15 has a first negative pressure generating unit 16, which generates the first air stream, and a first air guiding unit 17, associated with the first negative pressure generating unit 16, which guides the first air stream for exerting the pressing force on the label 8, here in particular on the label pressure side and/or adhesive side thereof. FIG. 3*a*) shows, by means of the arrows, how the first air stream is here guided out of the label suction assembly 15 and, as soon as a label 8 is supplied from the right, as is shown in FIG. 2*a*), flows against the label 8 and thereby exerts the pressing force on the label 8.

The term "associated" here means a functional association. Thus, it is in principle also possible, as will be explained further hereinbelow, to provide two negative pressure generating units and two air guiding units, wherein each negative pressure generating unit then cooperates functionally with its own, that is to say an associated, air guiding unit in order to guide the respective air stream in the described manner.

Here and preferably, it is further provided that the first air guiding unit 17 guides the first air stream for exerting the suction force away from the label 8, in particular away from the label suction side thereof. FIG. 3*a*) shows, by means of the arrows, how the first air stream is here introduced into the label suction assembly 15 and, as soon as a label 8 is supplied from the right, as is shown in FIG. 2*a*), suctions the label 8 and thereby exerts the suction force on the label 8.

As is apparent from FIG. 2*a*), the label suction assembly 15 here has a support surface 18 for the label 8, on which the label 8 lies with its label suction side in the transfer position. The support surface 18 can also be seen in FIG. 4 in the bottom view of the label suction assembly 15. Here and preferably, the first air guiding unit 17 guides the first air stream onto the label pressure side of the label 8, which faces away from the support surface 18, in order to exert said pressing force thereon (FIG. 2*a*), FIG. 3*a*)). The label 8 is thus subjected to the suction force, that is to say suctioned, by way of its label suction side and by way of its other side, the label pressure side, is subjected to the pressing force, that is to say pressed against the support surface 18, both of which happen at the same time.

The support surface 18 is here formed by a plate, which in turn is part of a housing base of the housing of the label suction assembly 15.

Here and preferably, the label suction assembly 15, in particular in the support surface 18, has one or more first suction openings 19 associated with the first air guiding unit 17 and through which the first air stream that is generated is guided into the label suction assembly 15. As is shown in particular in FIG. 4, a plurality of elongate, slot-shaped suction openings 19 are here provided, which each extend length-wise in the dispensing direction and are arranged one behind the other in the dispensing direction to form a row.

Here and preferably, one or more of the first suction openings 19 are covered partially or completely by the label 8 in the transfer position. The negative pressure, or the suction force, is then generated in the region in which the suction openings 19 are covered by the label 8. The respective suction opening 19 is thus here at least largely blocked. The term "at least largely" means that the respective suction opening 19 may optionally still draw in some air but may in principle also be completely blocked.

When the label 8 is in the transfer position, at least one of the first suction openings 19 here and preferably remains at least partially free. Thus, when the label 8 is suctioned, at least one of the first suction openings 19 is preferably not or at least not completely covered by the label. It is thus ensured that the first air stream never stops while the label 8 in question is being suctioned, whereby it is in turn ensured that the label 8, or the pressure side thereof, is also always blown by the first air stream in order to exert the pressing force on the label 8.

When the label 8 is in the transfer position, a portion of the first air stream flows from outside into the label suction assembly 15 through the free cross section (flow cross section) of the first suction openings 19 that is not covered by the label 8, and the remaining portion of the first air stream suctions the label 8 by way of the covered cross section of the first suction openings 19.

As is shown in FIG. 3*a*), the first negative pressure generating unit 16 here and preferably has a first flow machine, in particular a first fan 20, which generates the first air stream. The first flow machine or the first fan 20 is preferably electrically operated in order to generate the first air stream. Thus, in the proposed labelling device 1 according to the exemplary embodiment shown, a connection to an external, central compressed air supply is deliberately dispensed with, since this can be disadvantageous from an energy point of view. The first air stream can be generated in a particularly energy-efficient manner in particular by means of a fan 20.

FIG. 3*a*) further shows that the first air guiding unit 17 here and preferably has an incoming air channel 21 which begins with the first suction opening or the plurality of first suction openings 19 and which extends as far as the first negative pressure generating unit 16, in particular as far as the first flow machine or the first fan 20. Furthermore, the first air guiding unit 17 here and preferably has an outgoing air channel 22 which begins at the first negative pressure generating unit 16, in particular at the first flow machine or the first fan 20, and which extends as far as at least a first outlet opening 23 of the label suction assembly 15, through which the first air stream is guided for exerting the pressing force on the label 8. The incoming air channel 21 and the outgoing air channel 22 are here fluidically connected together by way of the first negative pressure generating unit 16. The incoming air channel 21 is thus separated from the outgoing air channel 22 by the first negative pressure generating unit 16, in particular by the first flow machine or the first fan 20. The first flow machine or the first fan 20 thus sits between the incoming air channel 21 and the outgoing air channel 20 of the first air guiding unit 17.

The outgoing air channel 22 and the at least one first outlet opening 23 are, as illustrated by the arrows in FIG. 3*a*), here and preferably arranged such that the first air stream for exerting the pressing force is guided onto the label 8 from the at least one first outlet opening 23 obliquely, in particular with a direction component running in the dispensing direction of the label 8. The direction in which the first air stream is guided out of the at least one outlet opening 23 is here defined as the main flow direction, that is to say the direction of the center line of the air stream leaving the first outlet opening 23. This main flow direction is here thus preferably directed obliquely onto the label 8, in particular onto the label pressure side thereof, which has the advantage that the at least one first outlet opening 23 lies outside an at least partially vertical movement range of the plunger 14, which will be described further hereinbelow, and/or outside the movement range of the label 8 as it is transferred from the transfer position to the surface of the package 2.

Particularly preferably, the cross section of the outgoing air channel 22 tapers at the end toward the at least one first outlet opening 23, so that the first air stream is compressed at that point. The tapering end portion of the outgoing air channel 22, which comprises the outlet opening 23, then functions as a nozzle.

FIG. 2*a*) further illustrates that, here and preferably, the label dispensing assembly 9 conveys the label 8 to the transfer position through a gap 24 between the support surface 18, on which the label lies 8 with its label suction side in the transfer position, and the at least one first outlet opening 23, through which the first air stream is guided for exerting the pressing force on the label 8. The at least one first outlet opening 23 is thus spaced apart from the support surface 18.

The explanations given hitherto of the proposed labelling device 1 related to a first air stream with which both a suction force and a pressing force can be exerted on the label 8 in order to fix the label 8 in the transfer position. In the case of particularly narrow labels 8, such a first air stream is often sufficient to fix them optimally. In the case of relatively wide labels 8, it may be necessary to suction them further by means of an additional, second air stream, as will be explained hereinbelow. In particular for this purpose, the label suction assembly 15, here and preferably, is further adapted to generate a further, second air stream, which is fluidically separate from the first air stream in the label suction assembly 15. In this case, the label suction assembly 15 is adapted to guide the second air stream in such a manner that an additional suction force is exerted on the label 8 in the transfer position. The additional suction force effected by the second air stream is here in particular exerted on the label 8 at a different point to the suction force effected by the first air stream. This second air stream is illustrated by corresponding arrows in FIG. 3*b*).

The generation of an additional suction force by means of a second air stream which is fluidically separate from the first air stream has the following advantage. The wider a label 8, that is to say the greater its extent transverse to the dispensing direction, the greater the influence, if the label 8 is suctioned at only one point or on only one side, of the force of gravity on the side of the label 8 that is not suctioned. The result is that the label 8 hangs down starting from the point or side at which it is suctioned. The greater the extent of a label 8 from the point or side at which it is suctioned, the more it bends downward and the more difficult it is for the label application assembly 13 or the plunger 14 to collect the label 8 and transfer it to the package 2. In addition, the label 8 is held by only a relatively small suction force and at the same time is blown with a pressing force that is relatively large in comparison, which entails the risk that the label will be blown out of the transfer position or at least will no longer be arranged optimally for precise transfer to the package 2.

Thus, in order that relatively wide labels 8 are fixed more securely in the transfer position, an additional second air stream is generated, which accordingly exerts an additional suction force on the label 8 and thus increases the total suction force relative to the pressing force exerted on the label 8. Preferably, the second air stream is therefore not, like the first air stream, also guided onto the label pressure side in order to generate a pressing force. The second air stream thus increases the suction force exerted on the label 8 without the pressing force exerted on the label being increased.

Here and preferably, the label suction assembly 15 has a second negative pressure generating unit 25 which generates the second air stream. Here and preferably, the label suction assembly 15 also has a second air guiding unit 26 which is associated with the second negative pressure generating unit 25 and guides the second air stream for exerting the suction force away from the label 8, in particular away from the label suction side thereof.

Here and preferably, the label suction assembly 15 accordingly has, in particular in the support surface 18, one or more second suction openings 27 associated with the second air guiding unit 26 and through which the second air stream that is generated is guided into the label suction assembly 15. As is shown in particular in FIG. 4, a plurality of elongate, slot-like suction openings 19 are likewise provided here, which each extend length-wise in the dispensing direction and are arranged one behind the other in the dispensing direction to form a row. A plurality of such rows are here located next to one another transverse to the dispensing direction.

Here too in particular, one or more of the second suction openings 27 are partially or completely covered by the label 8 located in the transfer position. The negative pressure or the suction force is then generated in the region in which the suction openings 27 are covered by the label 8. The respective suction opening 27 is thus here too at least largely blocked.

In the case of the second air stream too, when the label 8 is in the transfer position, a portion of the second air stream flows from outside into the label suction assembly 15 through the free cross section (flow cross section) of the second suction openings 27 that is not covered by the label 8, and the remaining portion of the first air stream suctions the label 8 by way of the covered cross section of the second suction openings 27.

The second negative pressure generating unit 25 also preferably has a flow machine, here referred to as the second flow machine, in particular also a fan, here referred to as the second fan 28, which generates the second air stream. The second flow machine, or the second fan 28, is likewise preferably operated electrically in order to generate the second air stream.

As is shown in FIG. 3*b*), the second air guiding unit 26 has an incoming air channel 29 which begins with the second suction opening or the plurality of second suction openings 27 and which extends as far as the second negative pressure generating unit 25, in particular as far as the second flow machine. Here and preferably, the incoming air channel 29 extends as far as at least one second outlet opening 30 of the label suction assembly 15, through which the second air stream emerges into the area surrounding the label suction assembly 15. The outgoing air thus flows directly into the surrounding area. However, according to an alternative embodiment, not shown here, it can also be provided that the second air guiding unit 26 has an outgoing air channel which begins at the second negative pressure generating unit 25, in particular at the second flow machine, and which extends as far as at least one second outlet opening 30 of the label suction assembly 15, through which the second air stream emerges into the area surrounding the label suction assembly 15, and that the incoming air channel 29 and the outgoing air channel are fluidically connected together by way of the second negative pressure generating unit 25.

In addition to generating the force (suction force and/or pressing force) exerted in each case on the label 8, the first and/or second air stream can advantageously also have further possible uses.

Thus, it can be provided that the first and/or second air stream, in particular the second air stream leaving the second outlet opening 30, is guided by the respective air guiding unit 17, 26, here the second air guiding unit 26, in such a manner that the dissipation of heat from a functional component of the label application assembly 13 and/or label dispensing assembly 9, in particular from the printer 12 of the label dispensing assembly 9, is effected. For example, the printer motor of the printer 12 generates heat which can be dissipated in this manner. To this end, the air stream, here the second air stream, in particular the outgoing air, is preferably directed to the functional component in question, for example the printer or printer motor.

It is also conceivable that the temperature of the first and/or second air stream, in particular of the first air stream which is guided from the first outlet opening 23 onto the label 8 for exerting the pushing force, is controlled. Temperature control comprises heating and/or cooling. In this manner, the temperature of the label 8 blown by the air stream can also be controlled. Relatively cold labels are in principle stiffer than warm ones. In addition, cold and thus stiff labels are less easy to suction and thus to fix. On the other hand, relatively warm and thus flexible labels can easily crease when they are conveyed from the label dispensing assembly 9 into the transfer position. By controlling the temperature of the air stream, optimal stiffness of the label 8 can be established.

In the case of the proposed labelling device 1, it is preferably provided, as is shown in FIG. 3*a*) and b), that the first fan 20 and/or the second fan 28 is a radial fan or an axial fan. In principle, however, other forms of fan are also conceivable for the first fan 20 and/or the second fan 28, such as a diagonal fan or tangential fan. Here and preferably, the first fan 20 is a radial fan and the second fan 28 is an axial fan. A radial fan, which here and preferably is especially to generate the pressing force in addition to the suction force, has a significantly better volume flow on the outgoing air side compared to an axial fan. An axial fan is equally as suitable as a radial fan for generating a suction force, but is less expensive, so that, from the point of view of cost, an axial fan is here sufficient for the second fan 28, which is preferably to generate only a suction force.

Here and preferably, the labelling device 1, as is shown schematically in FIG. 1, further has a control assembly 31 for controlling and/or regulating the first and/or second negative pressure generating unit 16, 25, in particular the first and/or second flow machine or the first and/or second fan 20, 28. Preferably, the control assembly 31 is adapted to carry out the control and/or regulation in dependence on the shape and/or size of the labels 8 in the dispensing direction. For example, the control assembly 31 switches on the second negative pressure generating unit 25, in particular the second flow machine or the second fan 28, only in the case of labels 8 having a length, that is to say an extent in the dispensing direction, which is less than a given length and/or in the case of labels 8 which exceed a given width, that is to say extent transverse to the dispensing direction.

As already indicated above and shown schematically in FIGS. 1 and 2, the label application assembly 13 for applying a label 8 to the upper side of the package 2 here and preferably has a plunger 14 having a plunger shaft 32 and a plunger foot 33. The plunger 14 transfers the label 8 by means of its plunger foot 33 from the transfer position to the surface of the package 2 in an application movement.

The plunger 14 is here and preferably in the form of a pendulum type plunger which, as is indicated in FIG. 2*a*) by arrows, is both linearly displaceable and pivotable. In particular, the plunger 14 has as the plunger foot 33 a suction foot, preferably a suction and blowing foot, for suctioning and in particular also blowing off the label 8. On transferring the label 8, the plunger 14, which here is in the form of a pendulum type plunger, here carries out an application movement in the transport direction so as to allow a package 2 moved by means of the feed assembly 3 to be labelled. By means of the label application assembly 13, the label 8 can be applied by contact, that is to say mechanically, by pressing the label 8 onto the package 2. In addition or alternatively, it is conceivable that the label 8 is applied contactlessly, for example in that a suction and blowing foot of the plunger 14 blows the label 8 onto the package 2 by generating a blast of compressed air which is directed toward the package 2, that is to say applies the label pneumatically. However, the plunger 14 can in principle also be a purely linear plunger, which is then movable only linearly, optionally in a plurality of directions orthogonal to one another. According to another embodiment, not shown here, it is in principle also conceivable that the label 8 is transferred directly from the transfer position to the surface of the package 2, in particular by means of a blast of compressed air which is directed onto the label 8 by the label suction assembly 15, preferably by a blowing head. In the latter case, a plunger is then not required for transferring the label 8.

It is further provided in the case of the proposed labelling device 1 shown here by way of example that the first and second air streams and/or the first and second negative pressure generating units 16, 25 and/or the first and second flow machines, or the first and second fans 20, 28, and/or the first and second air guiding units 17, 26 and/or the first and second suction openings 19, 27 are in each case spaced apart from one another in a direction transverse to the dispensing direction. This spacing apart transverse to the dispensing direction can be seen particularly clearly in FIG. 4.

Here and preferably, the plunger 14 of the label application assembly 13 is arranged in a region between the first and second air streams and/or the first and second negative pressure generating units 16, 25 and/or the first and second flow machines, or the first and second fans 20, 28, and/or the first and second air guiding units 17, 26 and/or the first and second suction openings. In particular, the plunger 14 is movable, preferably pivotable, in this region in and contrary to the dispensing direction of the label 8.

Finally, as is also illustrated in FIG. 4, here and preferably the cross section of a plurality or of all of the first and/or second suction openings 19, 27, here only of the first suction openings 19, decreases from suction opening to suction opening in the dispensing direction, that is to say with increasing distance from the dispensing edge 11. This applies at least for most of the suction openings 19, 27 and preferably for all of the suction openings 19, 27. In the case of an alternative embodiment, not shown here, in which only a single first and/or second suction opening is provided, it is accordingly conceivable that the cross section of the single first and/or second suction opening decreases in the dispensing direction, that is to say with increasing distance from the dispensing edge 11.

In both cases, the width, that is to say the extent transverse to the dispensing direction, of the suction openings thus decreases with increasing distance from the dispensing edge 11, or with increasing conveying distance of the label 8. Correspondingly, the suction force decreases with increasing distance from the dispensing edge 11, that is to say the point of the label 8 that is furthest from the dispensing edge 11 is suctioned with a lower suction force than a point of the label 8 that is closer to the dispensing edge 11. This has the following important advantage. The total suction force acting on the label 8 increases with increasing coverage of the first suction openings 19, optionally also of the second suction openings 27, so that a relatively long label 8 would be suctioned too strongly and would become stuck at its end remote from the dispensing edge 11, so that the label 8 conveyed further from the dispensing edge 11 would create ripples. Accordingly, the force is here reduced with increasing conveying distance of the label 8 by reducing the width of the suction openings, so that the label 8, even when it has a great length, is always conveyed further over its entire length until it has fully reached the transfer position. In the case of relatively short labels 8, the advantage is, in turn, that the width of the suction openings becomes greater with increasing proximity to the dispensing edge 11, and a greater suction force is thus generated, whereby shorter labels 8 are held better.

Particularly preferably, the cross section decreases stepwise, as is shown in FIG. 4 for the first suction openings 19, or, according to an alternative embodiment, not shown here, continuously.

The invention claimed is:

1. A labelling device for labelling individual packages, the labelling device comprising:

a feed assembly for transporting the individual packages;

a label dispensing assembly for dispensing a label that is removable from a strip of material in a dispensing direction to a transfer position; and a label application assembly for applying a label dispensed into the transfer position to a surface of one of the individual packages;

wherein the label application assembly includes a label suction assembly configured to pick up a label dispensed by the label dispensing assembly and fix the label in the transfer position, wherein the label suction assembly is configured to generate a first air stream and to guide said first air stream in such a manner that both a suction force and a pressing force are exerted on the label in the transfer position, wherein the label suction assembly comprises a first negative pressure generating unit for generating the first air stream, and wherein the label suction assembly comprises a first air guiding unit associated with the first negative pressure generating unit for guiding the first air stream to exert the pressing force on a label pressure side and/or a adhesive side thereof, wherein the label suction assembly has one or more first suction openings associated with the first air guiding unit and through which the first air stream that is generated is guided into the label suction assembly, and wherein the first air guiding unit has an incoming air channel which begins with the one or more first suction openings and which extends as far as the first negative pressure generating unit, wherein the first air guiding unit has an outgoing air channel which begins at the first negative pressure generating unit and which extends as far as at least one first outlet opening of the label suction assembly through which the first air stream is guided for exerting the pressing force on the label, and wherein the incoming air channel and the outgoing air channel are fluidically connected together by way of the first negative pressure generating unit.

2. The labelling device as claimed in claim 1, wherein the first air guiding unit is configured to guide the first air stream to exert the suction force away from a label suction side of the label.

3. The labelling device as claimed in claim 1, wherein the label suction assembly has a support surface for the label on which the label lies with its label suction side in the transfer position.

4. The labelling device as claimed in claim 3, wherein the first air guiding unit guides the first air stream onto the label pressure side of the label, which faces away from the support surface.

5. The labelling device as claimed in claim 1, wherein one or more of the first suction openings are covered partially or completely by the label in the transfer position.

6. The labelling device as claimed in claim 1, wherein, when the label is in the transfer position, at least one of the suction openings remains at least partially uncovered.

7. The labelling device as claimed in claim 1, wherein the first negative pressure generating unit has a first flow machine in the form of a first fan for generating the first air stream.

8. The labelling device as claimed in claim 1, wherein the outgoing air channel and the at least one first outlet opening are arranged such that the first air stream for exerting the pressing force is guided onto the label from the at least one first outlet opening obliquely with a direction component running in the dispensing direction of the label.

9. The labelling device as claimed in claim 3, wherein the label dispensing assembly is configured to convey the label to the transfer position through a gap between the support surface, on which the label lies with its label suction side in the transfer position, and the at least one first outlet opening, through which the first air stream is guided for exerting the pressing force on the label.

10. The labelling device as claimed in claim 7, wherein the label suction assembly is configured to generate a further, second air stream, which is fluidically separate from the first air stream in the label suction assembly, and to guide said second air stream such that an additional suction force is exerted on the label in the transfer position.

11. The labelling device as claimed in claim 10, wherein the label suction assembly is configured such that the additional suction force effected by the second air stream is exerted on the label at a different point to the suction force effected by the first air stream.

12. The labelling device as claimed in claim 10, wherein the label suction assembly has a second negative pressure generating unit for generating the second air stream, and wherein the label suction assembly has a second air guiding unit which is associated with the second negative pressure generating unit and is configured to guide the second air stream to exert the suction force away from the label suction side of the label.

13. The labelling device as claimed in claim 12, wherein the label suction assembly has one or more second suction openings associated with the second air guiding unit and through which the second air stream that is generated is guided into the label suction assembly.

14. The labelling device as claimed in claim 13, wherein one or more of the second suction openings are partially or completely covered by the label located in the transfer position.

15. The labelling device as claimed in claim 13, wherein, when the label is in the transfer position, at least one of the second suction openings remains at least partially uncovered.

16. The labelling device as claimed in claim 12, wherein the second negative pressure generating unit has a second flow machine in the form of a second fan for generating the second air stream.

17. The labelling device as claimed in claim 16, wherein the second air guiding unit has an incoming air channel which begins with the second suction opening or the plurality of second suction openings and which extends as far as the second negative pressure generating unit.

18. The labelling device as claimed in claim 17, wherein the incoming air channel extends as far as at least one second outlet opening of the label suction assembly, through which the second air stream emerges into the area surrounding the label suction assembly, or in that the second air guiding unit has an outgoing air channel which begins at the second negative pressure generating unit, and which extends as far as at least one second outlet opening of the label suction assembly, through which the second air stream emerges into the area surrounding the label suction assembly, and wherein the incoming air channel and the outgoing air channel are fluidically connected together by way of the second negative pressure generating unit.

19. The labelling device as claimed in claim 10, wherein the first and/or second air stream is guided by its respective air guiding unit for dissipating heat from a functional component of the label application assembly and/or label dispensing assembly.

20. The labelling device as claimed in claim 10, wherein the labelling device is configured to control the temperature of the first and/or second air stream.

21. The labelling device as claimed in claim 16, wherein the first fan and/or the second fan is a radial fan or an axial fan.

22. The labelling device as claimed in claim 12, wherein the labelling device has a control assembly for controlling and/or regulating the first and/or second negative pressure generating unit.

23. The labelling device according to claim 22, wherein the control assembly is configured to control and/or regulate the first and/or second negative pressure generating unit in dependence on the shape and/or size of the labels to be applied.

24. The labelling device as claimed in claim 16, wherein the label application assembly has a plunger having a plunger shaft and a plunger foot, and wherein the plunger transfers the label by means of its plunger foot from the transfer position onto the surface of the package in an application movement.

25. The labelling device as claimed in claim 16, wherein the first and second air streams and/or the first and second negative pressure generating units and/or the first and second flow machines and/or the first and second air guiding units and/or the first and second suction openings are in each case spaced apart from one another in a direction transverse to the dispensing direction.

26. The labelling device as claimed in claim 24, wherein the plunger of the label application assembly is arranged in a region between the first and second air streams and/or the first and second negative pressure generating units and/or the first and second flow machines and/or the first and second air guiding units and/or the first and second suction openings and is movable.

27. The labelling device as claimed in claim 26, wherein the plunger is pivotable in and contrary to the dispensing direction of the label.

28. The labelling device as claimed in claim 13, wherein the cross section of one first and/or second suction opening decreases in the dispensing direction, or in that the cross section of a plurality or of all of the first and/or second suction openings decreases from suction opening to suction opening in the dispensing direction.

29. The labelling device as claimed in claim 28, wherein the cross section decreases stepwise or continuously.

* * * * *